US006557039B1

(12) United States Patent
Leong et al.

(10) Patent No.: US 6,557,039 B1
(45) Date of Patent: Apr. 29, 2003

(54) SYSTEM AND METHOD FOR MANAGING INFORMATION RETRIEVALS FROM DISTRIBUTED ARCHIVES

(75) Inventors: Sang Leong, Matawan, NJ (US); William Telkowski, Lincoln University, PA (US)

(73) Assignee: The Chase Manhattan Bank, New York, NY (US)

( * ) Notice: Subject to any disclaimer, the term of this patent is extended or adjusted under 35 U.S.C. 154(b) by 0 days.

(21) Appl. No.: 09/439,909

(22) Filed: Nov. 12, 1999

Related U.S. Application Data

(60) Provisional application No. 60/108,245, filed on Nov. 13, 1998.

(51) Int. Cl.$^7$ .............................................. G06F 15/16
(52) U.S. Cl. .................... 709/229; 709/246; 709/201
(58) Field of Search ................................ 709/201, 203, 709/246, 247, 229, 236, 219, 217; 707/204

(56) References Cited

U.S. PATENT DOCUMENTS

| | | | | |
|---|---|---|---|---|
| 6,144,797 A | * | 11/2000 | MacCormack et al. | 386/117 |
| 6,304,967 B1 | * | 10/2001 | Braddy | 713/150 |
| 6,388,687 B1 | * | 5/2002 | Brackett et al. | 345/810 |

OTHER PUBLICATIONS

Nancy McGough, Archie, FTP, and Uncompression (Aug. 16, 1993) http://www.ii.com/internet/ftp/archie_ftp_uncompression.*
Peter Flynn, Revised Archie shell script for HTTP servers, v0.95b (No date) http://www.ucc.ie/info/net/archiedoc.*
FTPSEARCH, (1997) http://ftpsearch.ntnu.no/pub/ftpsearch.*
FTPSEARCH, (No date) http://www.alltheweb.com.*
Ashizawa, M., et al., "Using digital libraries as a community hall for worldwide information spiral development", Transactions of the Institute of Electronics, Information and Communication Engineers D–II, May 1998, Inst. Electron. Inf. & Commun. Eng., Japan, vol. J81D–II, No. 5, pp. 1014–1024, XP000910377; and.
Bhasker, B., et al., "Architecture and Implementation of an on–line data archive and distribution system", Proceedings Twelfth IEEE Symposium on Mass Storage Systems. Puttings All That Data To Work (CAT. No. 93CH3246–6), Proceedings of 12$^{th}$ IEEE Symposium on Mass Storage Systems, Monterey, CA, USA 26–29 Apr. 1993, pp. 177–182, XP002138055 1993, Los Alamitos, CA, USA IEEE Comput. Soc. Press, USA ISBN: 0–08186–3460–X.

* cited by examiner

Primary Examiner—Mehmet B. Geckil
(74) Attorney, Agent, or Firm—Dickstein, Shapiro, Morin & Oshinsky, LLP.

(57) ABSTRACT

A system and method for managing information retrievals from all of an enterprises' archives across all operating locations. A single "virtual archive" is provided which links all of the electronic archives of the enterprise, regardless of the location or configuration of the archive. The virtual archive allows for data aggregation (regardless of location) so the a user can have data from multiple physical locations on a single screen in a single view. A single, consistent and user friendly interface is provided through which users are able to access multiple applications through a single sign-on and password. Logical tables that are used to direct information retrieval requests to the physical electronic archives. The retrieved information is reformatted and repackaging to resolve any incompatibility between the format of the stored information and the distribution media.

57 Claims, 8 Drawing Sheets

SYSTEM AND METHOD FOR MANAGING INFORMATION RETRIEVALS FROM DISTRIBUTED ARCHIVES

CROSS REFERENCE TO RELATED APPLICATIONS

This application is based on and claims priority to U.S. Provisional Patent Application No. 60/108,245, filed Nov. 13, 1998, entitled SYSTEM FOR MANAGING INFORMATION RETRIEVALS FROM DISTRIBUTED DOCUMENT ARCHIVES ON A GLOBAL BASIS, the entire disclosure of which is hereby incorporated by reference.

FIELD OF THE INVENTION

The present invention generally relates to systems and methods for electronic information retrieval and more particularly to systems and methods for retrieving information from logically and geographically distributed and incompatible storage devices.

BACKGROUND OF THE INVENTION

Historically, corporations have used paper, microfilm and microfiche media for the long term storage of information important to the corporation. Each of these types storage media can take massive amount of physical storage space, and require considerable effort when the retrieval of stored information is necessary. Electronic storage archives have been developed that enable large electronic repositories that facilitate relatively easy retrieval of electronic files. Typically, these electronic storage archives allow the long term archival of document bitmap images, computer generated reports, office documents (e.g., word processing documents and spreadsheets), audio and video files, etc.

The hardware typically incorporated in an electronic archive is comprised of a general purpose computer and storage devices (such as magnetic disks, optical disks and magnetic tape subsystems). The hardware is typically operated and accessed by software comprising an operating system, database management systems, hierarchical storage management software (HSM) and archive management software. There are at least four significant limitations associated with current long term archival systems. First, larger corporations will invariably require several geographically diverse heterogenous archival systems in order to support the various operations of the corporation throughout the country and the world. For example, The corporation's research and development facility in London England has a separate archival system from the archival system for one of the corporation's manufacturing sites in Dallas Tex. Even if each of the archive facilities has a heterogeneous archival (e.g., a database manager) the hardware and the software comprising the archival at the two sites is invariably provided by two different vendors whose proprietary product are not interoperable (i.e., the software at the London site cannot be used to access the information stored at the Dallas site).

A related second problem is that even if the hardware and the software at the London and Dallas are from the same vendor, the corporation will typically not have any mechanism for managing information accesses at the enterprise level, treating all of the corporation's archives as single resource regardless of the location.

A third significant problem is that an electronic document stored in one format can only be used by the specific retrieval applications that support that document storage format. Frequently, retrieval applications have very different formatting requirements, thus creating further compatibility problems. For example, a check image contained in the archive facility of a bank is typically in TIFF-JPEG or TIFF-G4 format while the image of a bank statement is typically in IBM AFP, Xerox Metacode or Adobe PDF format. The retrieval application (e.g., Netscape or Microsoft browser) or device (Palm PC, smartphone) frequently cannot display images in the format in which the images are stored. Although both electronic files are images, they cannot be retrieved by the same retrieval application. This compatibility problem severely limits the range of retrieval solutions and frequently increases the cost and time in building custom file conversion functions.

A final significant limitation with current archive systems is that these systems impose great challenges in applying enterprise level management and control processes including consolidated usage tracking and billing information; performance measurement and management; uniform access and retrieval application and security and a uniform look and feel for document displays.

SUMMARY OF THE INVENTION

In light of the above problems associated with the traditional archive retrieval systems, the present invention manages information retrievals from all of an enterprises' archives across all operating locations. All of the electronic archives, regardless of the location, configuration or vendor makeup are linked to provide a single global framework for managing archive access. It thus provides system developers with a single "virtual archive" for accessing all of the enterprises' stored data, without the need to have location dependent programming code.

A first aspect of the present invention is the user interface. The goal achieved by the present invention with respect to the interface is to provide a single, consistent and user friendly interface. This is accomplished through the use of an intranet access portal. This single entry point for users is preferably enabled using a browser which provides access for the user to several retrieval application. By the use of a single entry point, users are able to access multiple applications through a single sign-on and password.

A second significant aspect of the present invention is the use of logical tables ("meta-descriptors") that are used to direct information retrieval requests to the physical electronic archives. By the use of these tables, no change what-so-ever (hardware or software) is required to the archives. The tables provide a high degree of location independence to information retrieval applications by creating a "virtual archive." This concept of a "virtual archive" provides for rapid application development and deployment, resulting in lower development and maintenance costs. The virtual archive furthermore allows for data aggregation (regardless of location) so the a user can have data from multiple physical locations on a single screen in a single view.

A third aspect of the present invention is the functionality of reformatting and repackaging the retrieved information. This is required because of the above described incompatibility between the format of the stored information and the distribution media. A final function performed by the present invention is automatic disaster recovery.

A further significant aspect of the present invention is the use of statistical analysis techniques in providing the requester with predicted response time based on historical performance of request queues. Depending on the requested object type, storage media of the requested object, overall archive workload factors and equipment (number of availability of tape drives), etc., the response time may be sub-second or several minutes. Using empirical performance statistics, multiple performance profile models (PPM's) are developed. Each retrieval request is classified with a matching PPM, and a delay factor (in seconds or minutes) is sent to the requesting application or user whenever response delays are expected.

The present invention provides significant advantages to a corporation over the existing archive systems. Document archives can be consolidated at strategic locations globally. Each location archive can serve the archival needs for all product and service lines of the corporation and provide generic storage capability covering a broad range of objects including office documents, document images, computer print reports, etc. Each business division of the corporation can leverage and share document management products developed by other divisions at much reduced costs and lead-time. The present invention allows many business divisions to have presence at multiple global geographical locations. A document archival infrastructure that could be leveraged on a global basis will facilitate our global service reach objective. Many new information retrieval products (e.g. customer Internet retrievals) can be provided though a single customer access point regardless of physical storage locations. This level of transparency in customer accesses to consolidated global information can be critical to a corporation's competitiveness in the new information age.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Figure 1:
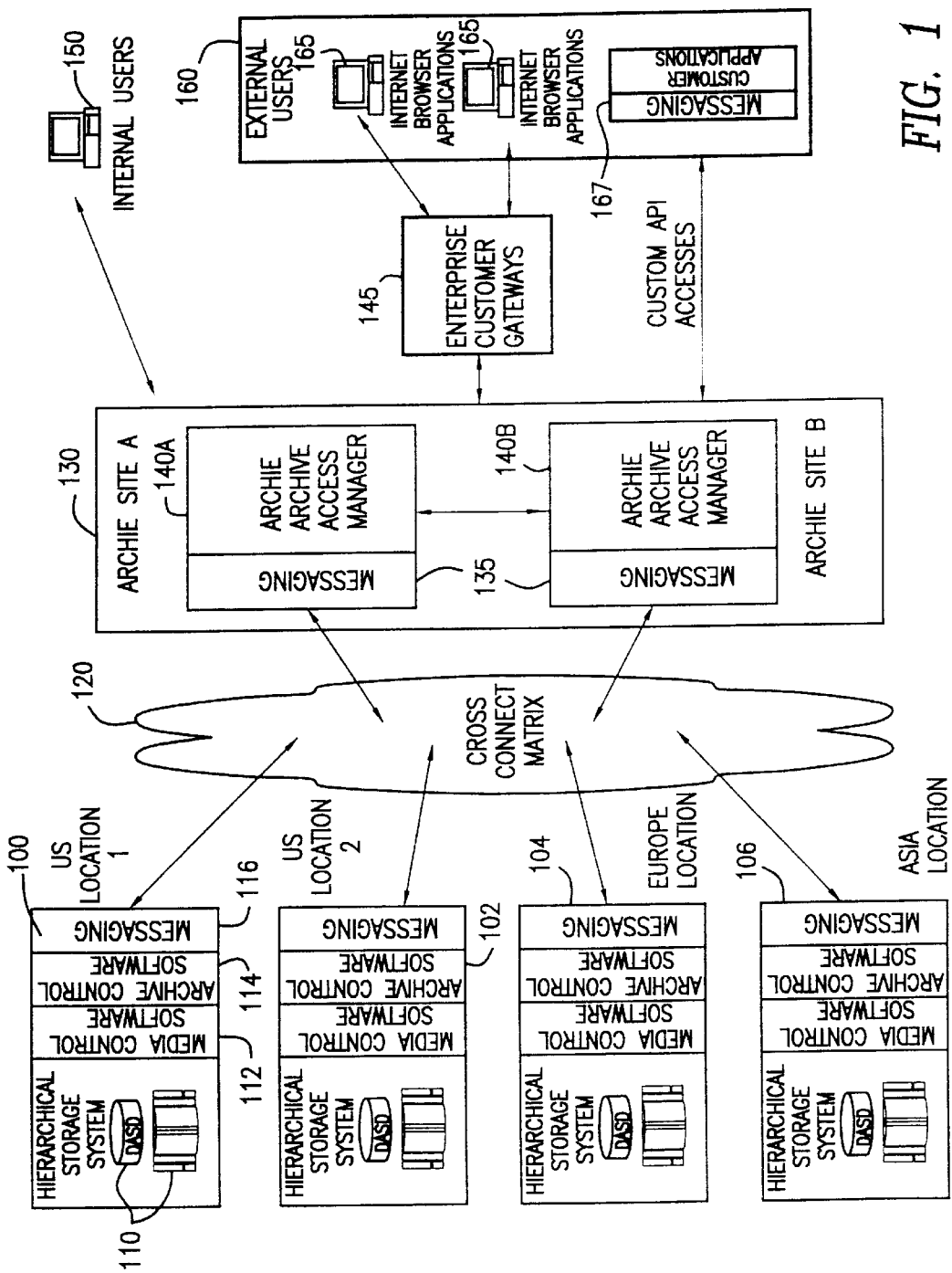
FIG. 1 depicts a high level diagram illustrating the components of the archive manager of the present invention.

FIG. 1 illustrates, at a high level, the system of the present invention and its relationship with respect to the electronic archives 100–106 of a enterprise and with respect to users 150, 160 of those archives. Elements 100–130 represent the electronic archives of a corporation. Illustrated in FIG. 1 are four different archives. Archives 100 and 102 represent domestically located archives while archive 104 is located in Europe and 106 in Asia. Although only four archives 100–106 are depicted in this Figure, the present invention is scalable such that the access to any number of electronic archives can be managed by the present invention. The archives 100–106 are heterogenous in configuration meaning that they are constructed of diverse constituent elements (e.g., hardware and software) and store a wide diversity of types of information.

Schematically included in each of the archives 100–106 are the physical storage devices 110, the software 112 for accessing the physical devices 110, the site specific software 114 for controlling access to archived information, and site specific messaging system 116 for communication with a site. Typical storage devices 102 include Direct Access Storage Devices (DASD), optical storage devices and magnetic tape devices. These storage devices are typically configured in a hierarchical manner such that information that is more recent or that is more often accessed is stored on devices with the quickest access time, for example DASD. Using conventional archiving techniques, as electronic information "ages", it is migrated for archival purposes from DASD to devices with a slower access time such as optical disks or magnetic tape. Optical disks and tape provide a cost effective means for the storage of large quantities of electronic information. Tapes are typically stored and accessed through tape silos while a large quantity of optical disks are stored and accessed from one or more jukeboxes. Some specific examples of storage devices 110 include IBM and EMC magnetic disks, STK magnetic tape silos, Boxhill RAID magnetic disks, and Hewlett Packard magneto-optical jukeboxes.

In a preferred embodiment of the present invention, the corporation is a financial institution (e.g., a bank) and the electronic information that is stored in storage devices 110 is generated an relied upon during the normal course of business for the institution. The banking industry furthermore has special regulations as to the storage and retention of certain type of documents such as checks. The following are examples of the type of electronic information stored in devices 110 by a bank and some of the different types of format in which the same data can be stored. Check images and document images can be stored in the following formats: TIFF/JPEG Multi-page; TIFF/G4 Multi-page; Federal Reserve bank Common Output Format (COF); TIFF/ABIC (gray scale or binary); IOCA/ABIC (gray scale or binary); MOD:CA/G4; JPEG; GIF; Encrypted binary files; and BLOB (binary large object). Computer reports and statements can be stored as: IBM AFP; Xerox Metacode; Adobe PostScript; HP PCL; Adobe PDF; ASCII text; and EBCDII text. Office documents can be stored for example as Microsoft Word document, Excel or PowerPoint files or as HTML files. Other Objects which are stored in archive storage devices 110 include XML documents, Audio files (WAV, MP3, etc), Video files (MPEG2,MPEG3, AVI, etc).

Each archival site 100–106 has its own specific set of media control application software 112 that is used to access the electronic information stored on the physical devices 110 located at the site. The type of media control software 112 will depend on the types and number of devices located at the site. Furthermore, even if two sites 100–106 have the same types of hardware devices 110, the media control software 112 employed at a particular site is very likely provided by a particular vendor and therefore be incompatible with the media control software 112 at a different site which has been provided by a different vendor. The same is true of the archival control software 114. This software is the application or suite of applications which provides the user interface for accessing all of the stored electronic information stores in the archives at a site 100–106. The archival control software 114 interfaces with the media control software 112 and is therefore site specific. The media control software 112 and archival control software 114 are typically hosted on hardware such as IBM RS6000 SP computers or Sun Microsystems servers and includes such software as IBM AIX or SUN Solaris operating systems, IBM DB2 DBMS, IBM OnDemand archive manager, IBM ADSM media manager, and SYBASE System 11 DBMS AMASS storage manager. The present invention maintains a profile of each of the archives through the use of tables. A preferred format of the archive application profile table is illustrated in Table 1.

As seen in FIG. 1, the archival control software 114 also interfaces with the software component of the messaging system 116 employed at each site. The messaging system 116 will also vary from site to site, typically being provided by different vendors such as the MQSeries from the IBM corporation.

Element 130 represents major components of the archive access system of the present invention, the system 130 contains two archive access managers 140A and 140B. In accordance with conventional disaster recovery techniques, one of the access managers 140A is located at physical site A and the second access manager 140B is located at a physical site B. The operations between these sites A and B are mirrored thereby providing quick recovery should one or the other of the sites experience an outage. Either of the sites 140A or 140B is capable of handling the complete load of the system 130. Each of the access managers 140A and 140B communicates with the geographically distributed archives 100–106 though messaging systems 135 and a cross connect matrix 120. The cross connect matrix allows both of the sites 140A and 140B to communicate with any of the messaging systems 116 at the various sites 116. In one embodiment of the present invention the cross connect matrix consists of the public Internet.

Three different user interfaces are depicted in relation to the archive system 130. The first is for employees of the corporation 150 denoted as internal users. This interface can be enabled through the Internet using common browser technology, through a client/server configuration or through a customer Application Program Interface (API) specially developed for access to the archive management system 130. The other two classes of interfaces are similar, but are used by external users, typically customers of the corporation. In one embodiment, an external user 165 uses an Internet browser application to connect to the system 130 through a customer gateway 145. The gateway 145 comprises the proper security mechanisms, for example a firewall, to ensure that only authorized users are allowed to connect to the system 130 and eventually the archives 100–106. The last user interface shown in FIG. 1 is by an eternal user 167 through a custom API developed especially for access to the system 130. This type of interface would be used by a customer with special needs such as requiring special access or the transference of large amount of data on a regular basis. As with the gateways 145, access to system 130 through the custom APIs is controlled using proper and conventional security mechanisms. The details of each of the requesting applications employed by the various users 150, 160 of the system are kept in tables. Table 2 illustrates a preferred format of the requesting application tables. These tables allow the system 140 to quickly identify the requesting application and all of the parameters associated with the application.

Figure 2:
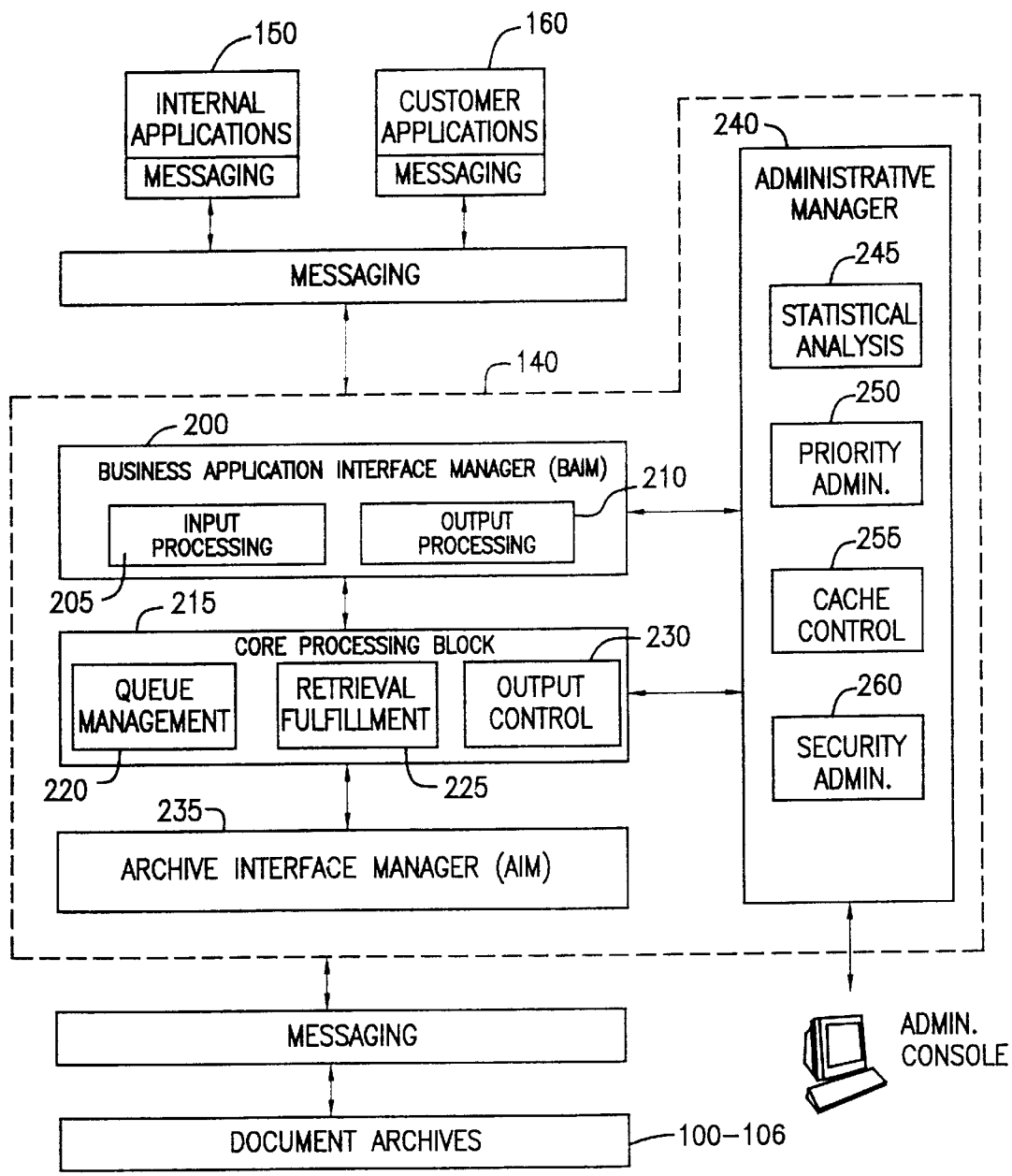
FIG. 2 illustrates the main component parts of the archive access manager of the present invention.

FIG. 2 illustrates the main component parts of the archive access manager 140 of the present invention. The archive access manager 140 discussed with respect to this Figure is the configuration of both of the archive access managers 140A and 140B discussed with respect to FIG. 1. The four main components are a Business Application Interface Manager (BAIM) 200, a Core Processing Module (CPM) 215, an Archive interface manager (AIM) 235, and an Administrative manager 240. In overview, the BAIM 200 provides the user interface for receiving requests for archived data from customers 150, 160 and for transmitting the requested data back to the customer 150, 160 once the archived data has been retrieved. The CPM 215 is responsible for the management of file retrievals and reformatting of data. The AIM 235 performs the actual retrievals of electronic information from the various archives 100–106. The Administrative Manager 240 performs various administrative functions with respect the operation of the archive access system 140.

Figure 3:
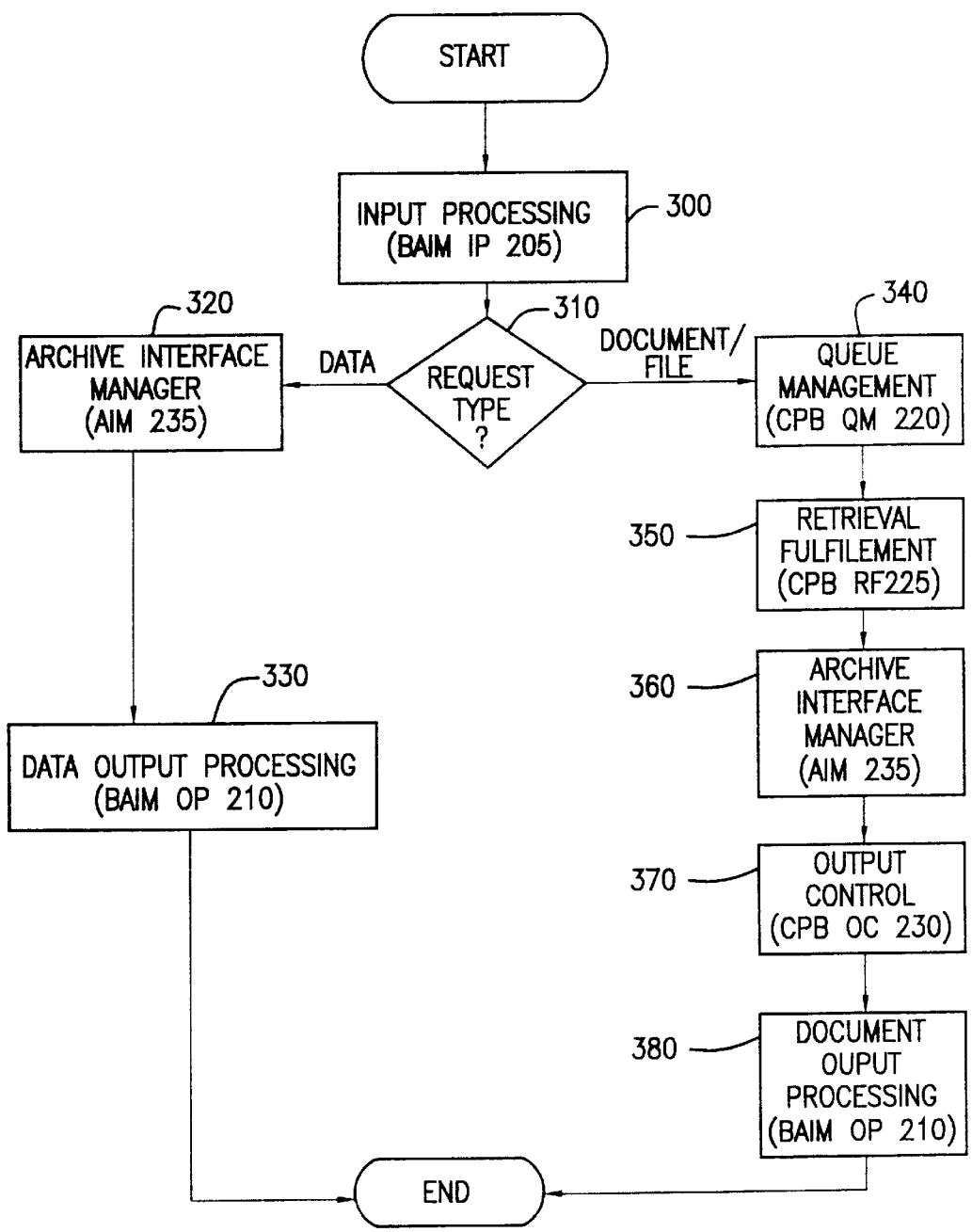
FIG. 3 depicts an overview of the processing and flow of information through archive access system.

FIG. 3 depicts an overview of the processing and flow of information through archive access system 140. In step 300 the BAIM Input Processing section 205 (see FIG. 2) receives and processes information requests from users. It is determined in step 310 what type of information is being requested. If the information is data which can be located using database indexes, the request is forwarded to the AIM module 235 in step 320 which retrieves the data from the archives 100–106. Upon retrieval of the data, it is processed in step 330 for presentation to the user by the Output Processing module 210 of the BAIM 200. In a preferred embodiment, this retrieval occurs in two steps. First, the relevant index is retrieved and presented to the user (e.g., the user requests to see checks for the month of August from a particular account). When the user selects particular data items to view from the retrieved index, the system 140 retrieves the actual data for presentation to the user. Since indexed data is typically stored on DASD (quick retrieval time) the more complex retrieval process (e.g., prioritization) employed for the retrieval of documents described below is not required but could be used.

If the requested information is a document or a file, the request is queued in step 340 by the Queue Management section 220 of the CPB 220. The streamlined process described above with respect to data retrievals is less effective for documents or other files (e.g., images) since these types of electronic information are more likely archived in longer term storage such as tape or optical disks. Requests are processed off the queue (or queues) in step 350 by the Retrieval Fulfillment module 225 which passes the request to AIM module 235 for retrieval of the document or file in step 360. After the document or file has been retrieved from the archives 100–106, it is first processed by the Output Control section 230 of the CPB 215 in step 370 and then passed onto the Output Processing section 210 of the BAIM 200 for final preparation for presentation to the user in step 380.

As described above, the BAIM module 200 receives requests for archived information from customers 150, 160 and transmits the retrieved information back to the customer 150, 160. BAIM 200 accomplished these functions by its Input 205 and Output 210 processing components. As described above with respect to FIG. 1, there are generally three types of business applications employed by users 150, 160 in communicating with the archive access manager 140 of the present invention: Internet/Intranet applications; Client-Server applications; and Messaging based applications. In a preferred embodiment, the present invention supports the following interface protocols: IP/HTTP, CORBA and IBM MQ Series, although the present invention can be modified to support virtually any interface protocol. XML data structures can be used within all interface messages.

Internet/Intranet applications use the IP/HTTP protocol and Internet Browsers (such as Netscape Navigator or Microsoft Internet Explorer). Intranet applications can be built with JAVA, C++, Javascript, Vbscripts, or other such languages. Client/Server applications require a communications network and a server for communicating with the archive access manager 140 from a user work-stations and can be built with programming tools such as Visual Basic, Visual C++, Visual FoxPro, PowerBuilder or JAVA.

Messaging systems such as IBM MQ Series or Microsoft MSMQ can also be used to communicate between a user applications and archive access manager 140. Such systems pass information from system to system using discrete messages. Messaging application systems may operate in asynchronous mode or real-time synchronous mode (e.g., via Tuxedo/M3, RPC calls, especially suited for overseas communications). Using messaging is a preferred method of communication with archive access manager 140 since messaging allows diverse platforms to communicate cost-effectively.

Both Input Processing 205 and Output Processing 210 sections of the BAIM 200 are queue driven. As a user logs onto system 140, the user is identified by its requestor application ID and assigned a request queue. The Input 205 and Output 210 Processing sections share the same queue in accordance with the requestor application ID. The queue structure allows for accurate tracking and auditing of the status of a request from a user. As requests come in from users, the Input Processing section 205 places the request on the queue assigned to the user and as the requested data comes back from the archives 100–106, the Output Processing section 210 marries up the retrieved information with the request.

Figure 4:
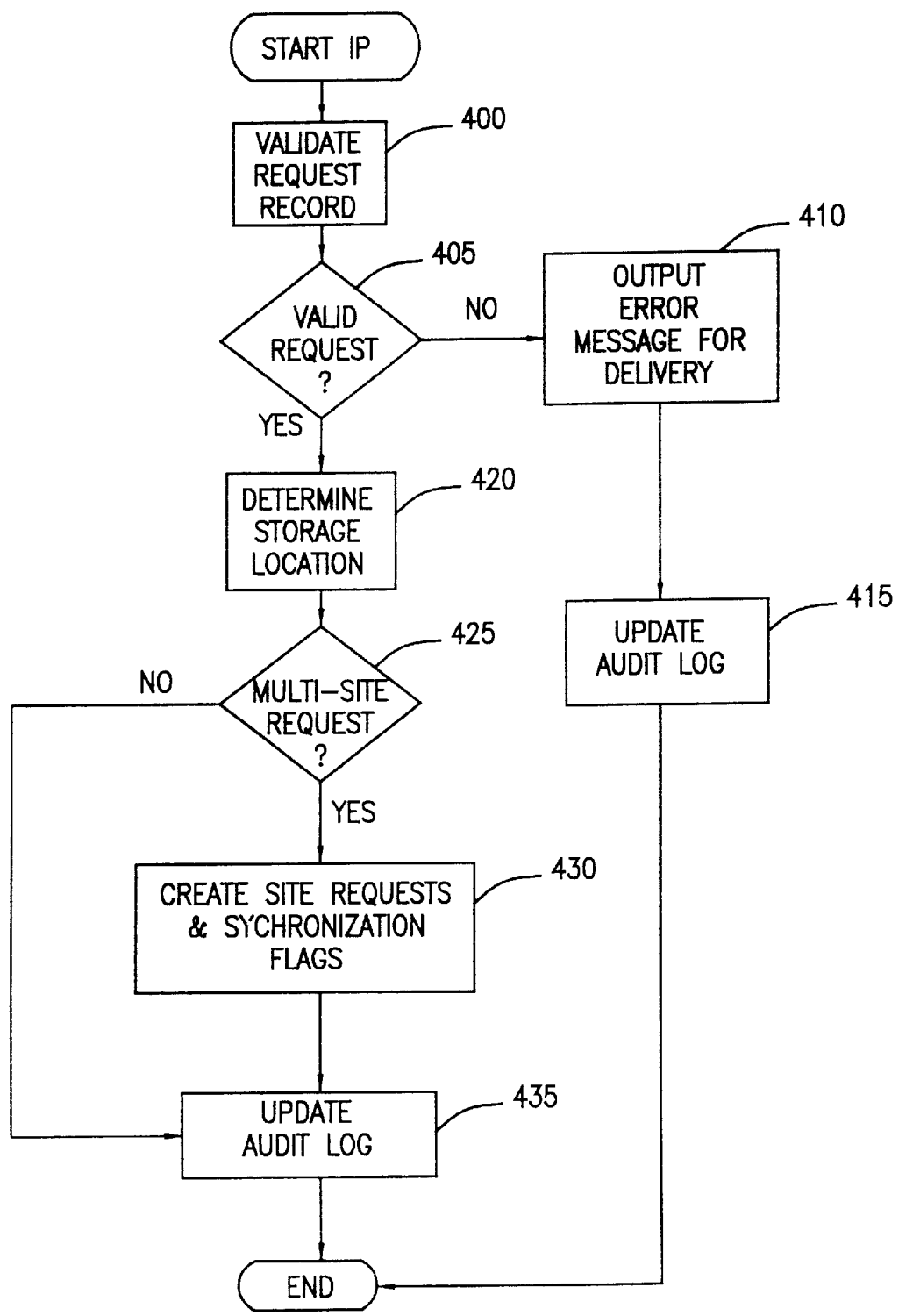
FIG. 4 illustrates the processing that occurs in the Input Processing section of the Business Application Interface Manager.

FIG. 4 illustrates the processing that occurs in the Input Processing section 205 of the BAIM 200. One of the first functions of the Input Processing section 205 is to validate (steps 400–405) the format and contents of the request from a user. The request is determined to be invalid, the request is rejected and in step 410 an error message is generated from return to the user. The error message will inform the as to the reason(s) why the request was rejected. In step 415 the audit log for the system is updated with the fact that the request was rejected. The audit log is file which is updated for any significant event which occurs with respect to a request (e.g., the request was passed onto the next processing section). In validating the request, the Input Processing section 205 checks both the format and the content of the request.

Each request assembled and transmitted by the user's application 150, 160 contains the following fields: a request source area ID, the requestor application ID described above; an archive application ID; a request Date/Time; a request sequence number; a request type (Data or document/file); an Interface method; a service class; a delivery format; whether and what type of encryption is required; whether and what type of authentication is required; and a request parameter string. A preferred format of the information request entry is depicted in Table 3.

Figure 7:
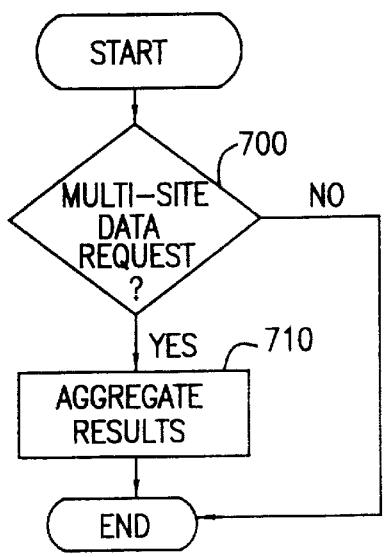
FIGS. 7 and 8 illustrate the processes of the Output Control Section of the Core Processing Block.

In step 420 depicted in FIG. 4, the Input Processing section 205 determines the storage location that has archived the data/document/file being requested by the user 150, 160. At the startup of system 14, a storage location table is created in system memory from the meta-descriptor tables. This table enable a high speed look-up of the storage locations of the information requested by the user. Table 4 depicts a preferred format of the archive location table. In step 425 it is determined if the request by the user requires the retrieval of information from multiple sites. This determination is accomplished from the results of the table look-up. If the information is located at only one archival site 100–106, the audit log is update in step 435 and the request is passed on the Core Processing Block 220 for fulfillment (see discussion below with respect to FIG. 7). If the request requires information from several sites 100–106, in step 430 the Input Processing section 205 creates the requests for information from the multiple sites 100–106 and generates synchronization flags for the coordination of the requests and the retrieval of the information.

As the Core Processing Block 220 receives requests for information retrievals from the BAIM Input Processing section 205, the requests are queued by the Queue Management module 220. The service class contained in the request from the user 150, 160 is used by the Queue Management module 220 to set the priority the request. If the Queue Management module 220 has calculated that there will be a delay with respect to fulfilling the request (with respect to the priority indicated by the user in the assignment of the service class) the Queue Management module 220 sends an advice message to the output queue (see below) for immediate delivery to the requesting application.

Figure 5:
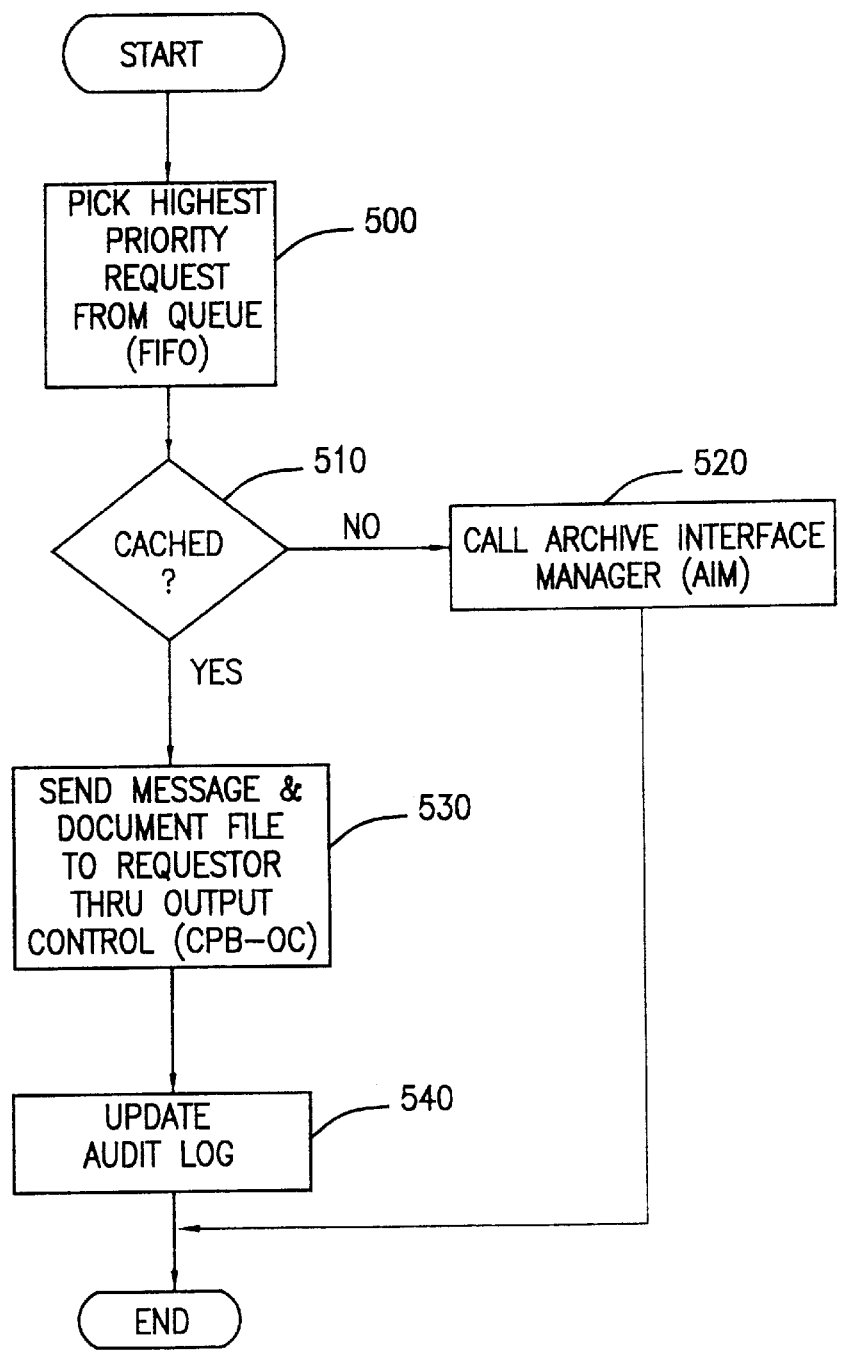
FIG. 5 depicts the process followed by the Retrieval Fulfillment module.

The Process Retrieval Fulfillment module 255 is responsible for processing the requests from the queues established by the Queue Management module 220. The process followed by the Retrieval Fulfillment module 225 is illustrated in FIG. 5. In step 500, the Retrieval Fulfillment module 225 retrieves the request with the highest priority from the queue. In step 510, it is determined whether the requested information has previously been retrieved and is already cached by the system 140. The caching feature of the present invention is more fully described below with respect to the cache control module 255 (see FIG. 2). If the information is not found in the cache, the Retrieval Fulfillment module 225 calls the Archive Interface manager 235 to perform the actual retrieval function (see FIG. 6 and associated description). If the information has been cached, the Retrieval Fulfillment module 225 retrieves the document or file from the cache in step 530 and returns it with a message to the Output Control 230 of the CPB 215 for eventual transmittal back to the requesting user 150, 160 as described below. As with any substantive action by system 140, the audit log is updated in step 540.

Figure 6:
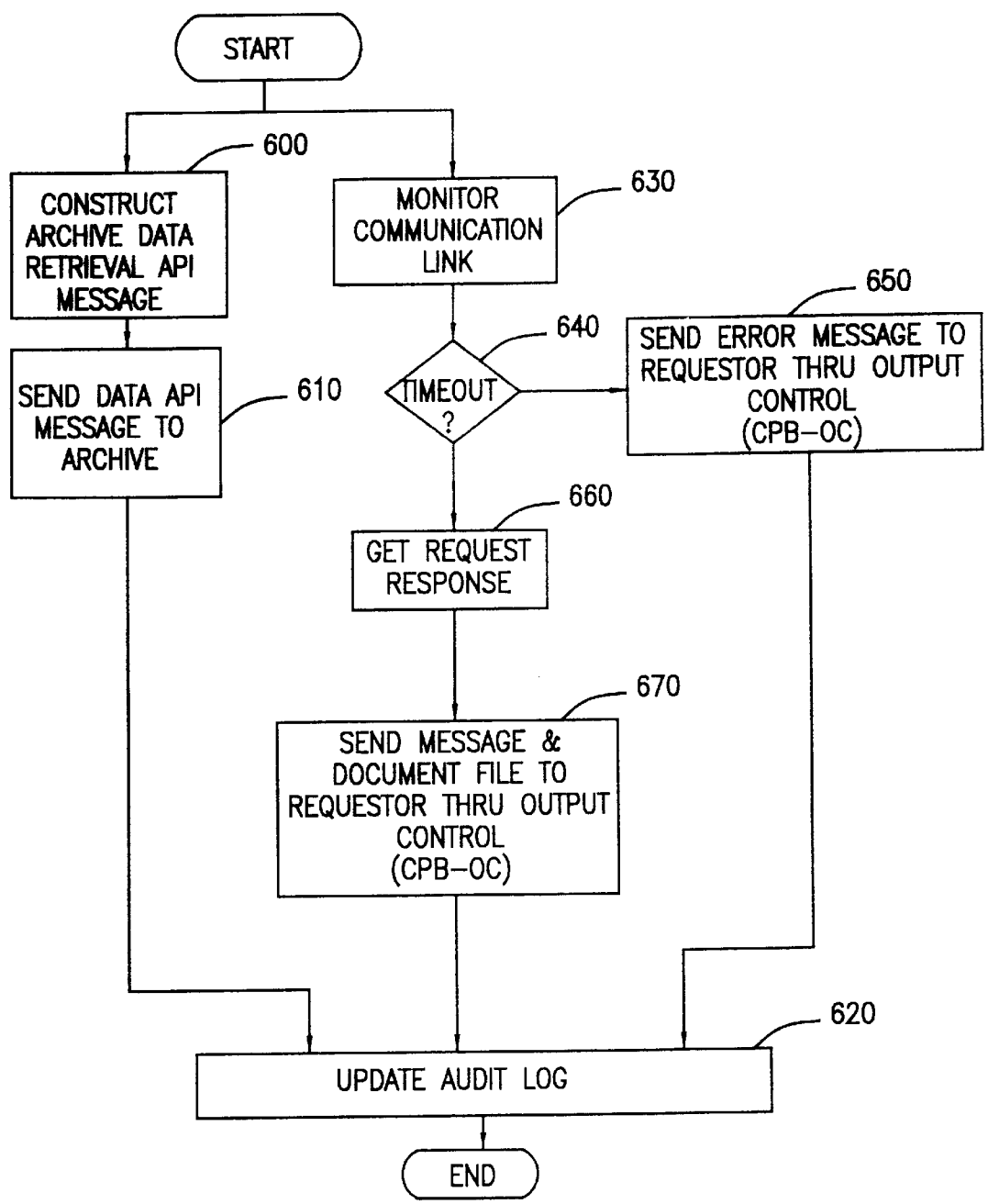
FIG. 6 shows the processes flow performed by the Archive Interface Manager.

The processes flow performed by the Archive Interface Manager (AIM) 235 is depicted in FIG. 6. As with the other modules, the AIM 235 is queue driven. There is one retrieval queue for each Archive Application ID. Furthermore, there is one instance of the AIM module 235 for each Archive Application ID. The Archive Application IDs represent a logical storage folder. For example, corporate checks might be associated with a first Archive Application ID and bank DDA statements might be assigned to the second different Archive Application ID. Each archive location typically has one or more physical archives and each of the physical archives typically has many Archive Application IDs. For example if there are two archival locations, each with four Archive Application IDs, there will be eight retrieval queues and eight instances of AIM 235 servicing those queues. The AIM 235 performs two general operations, one for sending request messages and one for retrieving the results of the request. In step 600, AIM 235 constructs a retrieval message based on a request received from the Retrieval Fulfillment module 225. In step 610, the retrieval message is through the messaging system to the archive 100–106 that contains the requested data and the audit log is updated in step 620 to reflect the fact that the request message has been sent to the archive 100–106.

In order to look for the responses to the request messages, AIM 235 monitors the communication link each of the archives responses in step 620. If AIM 235 detects that the communications link is disconnected, it sends message to Administrative Manager 240 (see FIG. 2). In step 640, if the time for the expected response from an archive 100–106 has expired, AIM 235 generates an error message in step 650 which is subsequently transmitted back to the user 150, 160. AIM 235 maintains a timeout value for each retrieval request and monitors the physical communication link for the messages In step 660, AIM 235 has successfully received the requested document/file from the archive 100–106 and forwards the retrieved document/file to the Output Control module 230 for eventual transmittal back to the user 150, 160.

Figure 8:
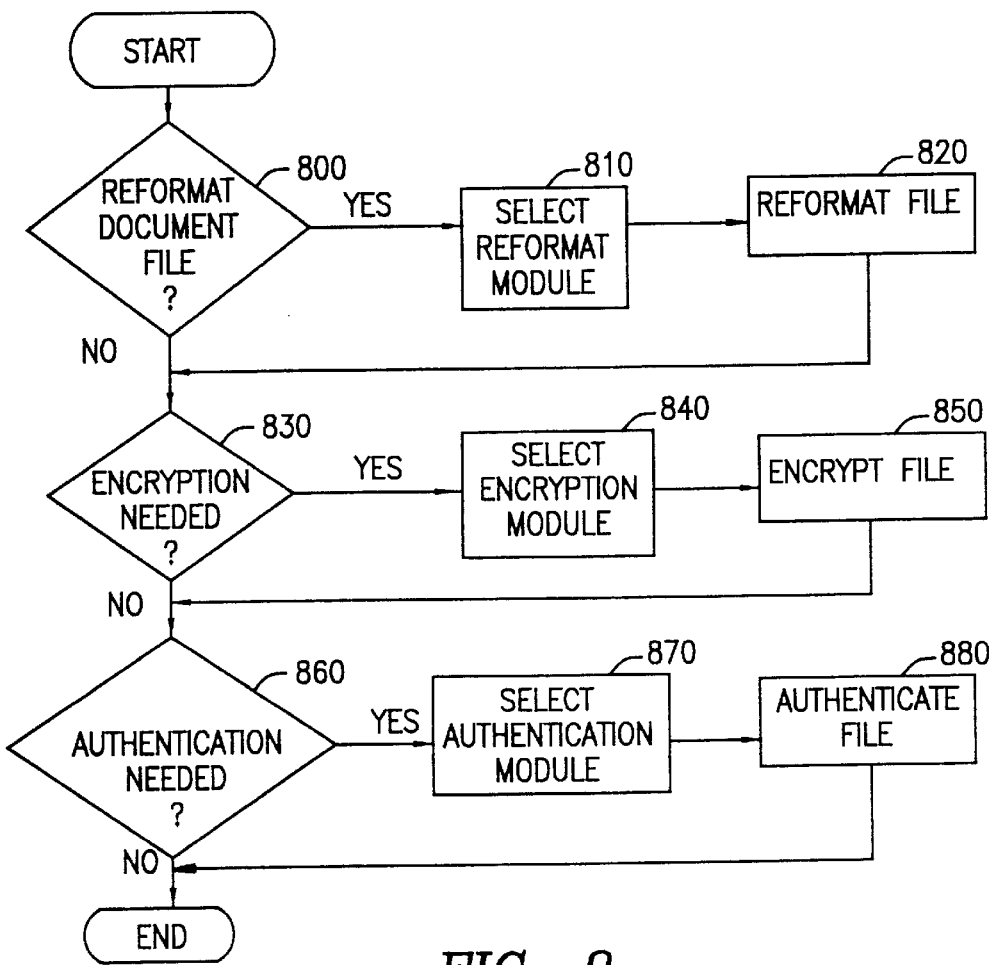

The Output Control section 230 of the CPB 215 ( see FIG. 2) performs two separate routines. In the first routine illustrated in FIG. 7, the Output Control Section 230 determines in step 710 whether the document/file received from AIM 235 is part of a multi-site request. If the data is not part of a multi-site request, control is passed to the second routine illustrated in FIG. 8. If the data is part of a multi-site request, the Output Control Section 230 waits until all of the data has been retrieved and then in step 7–10 aggregates the results. As illustrated in FIG. 8, the Output Control Section 230 further performs several formatting functions with respect the retrieved data. In step 800 the actual format of the retrieved object is determined and checked against the requested delivery format required by the user 150, 160. If reformatting of the document/file (e.g., image) is required, the appropriate reformatting module is selected in step 810 which reformats the data in step 820.

In step 830, the Output Control Section 230 determines if encryption is required with respect to the retrieved data. The user 150, 160 specifies in the original request whether the data as returned to the user 150, 160 needs to be encrypted and the type of encryption required. In step 840 the appropriate encryption module is selected which obtain encryption key (located in a user profile and security table (not shown)] and encrypts the retrieved document/file as specified by the user 150, 160. In step 860 it is determined if the authentication is required. Again, the user 150, 160 in the original request specifies if authentication is requires. In step 870, the appropriate authentication module is selected which obtain authentication key or digital certificate and authenticates document/file in step 880.

Figure 9:
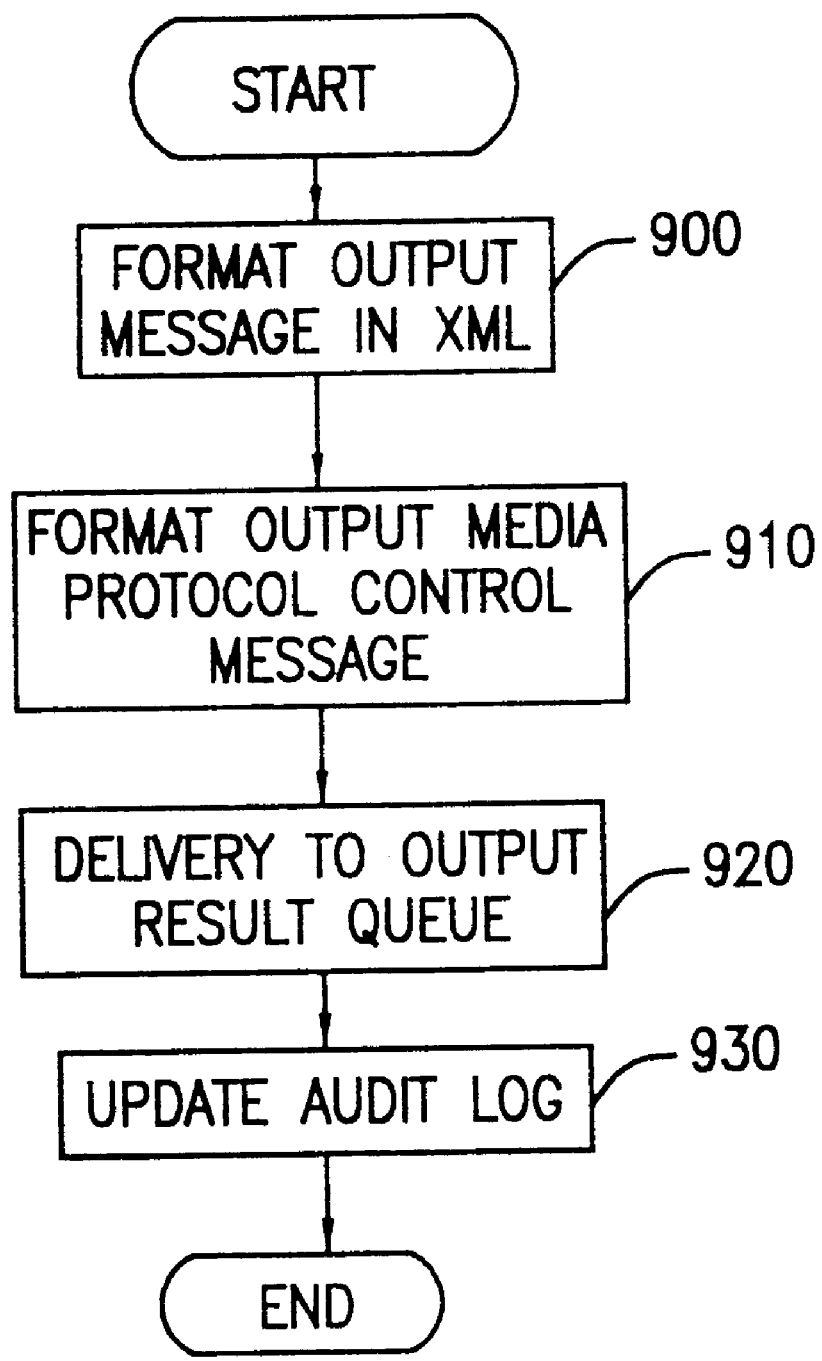
FIG. 9 depicts the process followed by the Output Processing module of the Business Application Interface Manager.

Documents/files which have been processed (reformatted, encrypted and or authenticated) by the Output Control Section 230 of the Core Processing Block 215 are placed on an output result queue for transmission back the requesting user 150, 160 by the Output Processing module 210 of the BAIM 200. The process followed by the Output Processing module 210 is shown in FIG. 9. In step 900, the output message containing the retrieved document/file is formatted in XML or other alternative message format. The XML message is then incorporated in a message formatted in step 910 for the particular communication media employed by the user 150, 160 (e.g., IP/HTTP, CORBA, MQ Series, etc). The properly formatted message is then delivered in step 920 for delivery to the user 150, 160 thus completing the request operation. As always, the audit log is updated reporting the successful fulfillment of the retrieval request.

FIG. 2 additionally illustrated the administrative functions employed in the archive access system 140 of the present invention. The Statistical Analysis section 245 of the Administrative manager 240 performs various statistical analysis functions including performance measurement & prediction. This function is primarily accomplished by extracting data from the audit log. Some of the useful statistical information which is generated from the audit log includes the access duration and time for each user, and by application ID; the number of documents accessed for each user, and by application ID; and the response time for each access for each user, and by application ID. Each of these statistics is useful in determining the loads, peak times and responsiveness of the system 140 in order that the system may be adjusted in response to the observed performance.

The Statistical Analysis section 245 maintains a statistical data warehouse. From this data, performance predictive profiles can be created, which, for each application, can calculate the average response time for standard DASD retention period and a tape retention period. Statistical analysis techniques are employed that provide the requester with predicted response time based on historical performance of request queues. Depending on the requested object type, storage media of the requested object, overall archive workload factors and equipment (number of availability of tape drives), etc., the response time may be sub-second or several minutes. Using empirical performance statistics, multiple performance profile models (PPM's) are developed. Each retrieval request is classified with a matching PPM, and a delay factor (in seconds or minutes) is sent to the requesting application or user whenever response delays are expected The Statistical Analysis section 245 further generates and maintains billing statistics from which it creates billing reports and output files for use by management.

The Priority Administration section 250 allows the manual intervention to change the priority number (01–99) for an individual request or a group of requests. This function allows dynamic priority re-assignment during periods where heavy request volumes are creating request backlogs.

As described above, the system 140 caches the most recently retrieved information in order enhance the performance of the system. Often, repeated requests for the same information are made with the same day, week or month. Caching Control module 255 is responsible for maintaining the cached information. Caching control module 255 actively manages the cache retention schedule in which the duration of the caching of particular information varies by the archive application. Different schedule of retention are determined for different types of information based on the pattern of requests for the information. In addition to caching new documents, the Caching Control module 255 is responsible for cleaning up cached documents whose retention period has expired.

Security Management section 260 is responsible for providing standard security administration services to Intranet applications as well as providing standard user sign-in security and checking the authenticity of the requesting business applications. One of the advantageous features of the present invention is that a user 150, 160 needs only sign on to system 140 once and the Security Management section 260 is responsible for ensuring that the user 150, 160 is authorized to retrieve the requested information. The user is not required to go through separate sign-on and password procedures for each of the archive systems 100–106 from which information is requested.

TABLE 1

| Data Element | Type | Comments |
|---|---|---|
| Archive Application ID | Alphanumeric | Centrally assigned to each area Must match IBM OnDemand application ID |
| Application Name | Character | |
| Contact | Character | |
| Primary storage objects (up to 10 object types) | Alphanumeric | TIFF/JPEG, TIFF/G4 COF, TIFF/ABIC, IOCA/ABIC, MOD:CA/G4, JPEG, GIF, BLOB, AFP, Metacode, PostScript, PCL, PDF, ASCII, EBCDII, Word, Excel PowerPoint, HTML, XML, WAV, MP3 MPEG2, MPEG3, AVI |
| Primary Archive ID's (up to 10 archives) | Alphanumeric | Centrally assigned to each area A1 - Check archive Houston A2 - Check Archive - Somerset B1 - Customer archive - Houston B2 - Customer Archive - Wilmington T1 - Lockbox archive - UK T2 - Lockbox archive Hong Kong T3 - Disbursement archive - Syracuse |
| Backup Archive ID's (up to 10 archives) | Alphanumeric | Centrally assigned to each area A1 - Check archive Houston A2 - Check Archive - Somerset B1 - Customer archive - Houston B2 - Customer Archive - Wilmington T1 - Lockbox archive - UK T2 - Lockbox archive Hong Kong T3 - Disbursement archive - Syracuse |
| Cache rule - incoming new items | Numeric | No of days |
| Cache rule - retrieved items | Numeric | No of days |

TABLE 2

| Data Element | Type | Comments |
|---|---|---|
| Requestor Application ID | Alphanumeric | Centrally assigned to each area |
| Application Name | Character | |
| Contact | Alphanumeric | |
| Preferred interface protocol | Alphanumeric | |
| Application descriptions | Alphanumeric | |
| Storage encryption? | Logical | Yes or No |
| Delivery encryption enabled? | Logical | Yes or No |
| Delivery encryption type allowed* | Alphanumeric | |
| Delivery encryption key | Alphanumeric | Stored encrypted |
| Delivery authentication enabled? | Logical | Yes or No |
| Delivery authentication type allowed** | Alphanumeric | |
| Delivery authentication encryption key | Alphanumeric | Stored encrypted |

*Encryption Type
ENCRYPTDES = DES Encryption
ENCRYPTDES3 = Triple DES encryption
**Authentication Type
AUTHRSA = RSA Public key authentication
AUTHX509 = X.509 digital certificate authentication
AUTHDESMAC = DES MAC private key authentication

TABLE 3

| Data Element | Type | Comments |
|---|---|---|
| Request Source Area ID | Alphanumeric | Centrally assigned to each area |
| Requestor Application ID | Alphanumeric | Centrally assigned to each area |
| Archive Application ID | Alphanumeric | Centrally assigned to each area |
| Request Date/time | Numeric | |
| Request sequence number | Numeric | Sequence control number, assigned by requesting area. Incremented by 1 for each request. |
| Request type | Alphanumeric | D1 = Data record(s) only F1 = Document file F2 = Image File |
| Interface method | Alphanumeric | HTTP = IP/HTTP protocol CORBA = CORBA protocol MQ = MQ Series protocol |
| Service Class | Alphanumeric | Centrally assigned to each Requestor area. 1–10 Immediate delivery 11–20 Delayed delivery - same day 90–99 Overnight Delivery |
| Delivery Format | Alphanumeric | Blank = Original storage format (Default) TIFF01 = TIFF/G4 or TIFF/JPEG TIFFG4 = TIFF/ITU G4 only JPEG = JPEG Only TIFFJPEG = TIFF/JPEG PDF = Adobe PDF only |
| Delivery Encryption | Alphanumeric | Blank = (Default) ENCRYPTDES = DES Encryption ENCRYPTDES3 = Triple DES encryption |
| Delivery Authentication | Alphanumeric | Blank = (Default) AUTHRSA = RSA Public key authentication AUTHX509 = X.509 digital certificate authentication AUTHDESMAC = DES MAC private key authentication. |
| Request parameter string | Text string | SQL statement string |

TABLE 4

| Data Element | Type | Comments |
|---|---|---|
| Archive ID | Alphanumeric | Centrally assigned to each archive |
| Archive Name | Character | |
| Physical address | Alphanumeric | e.g. IPxxx.xxx.xx.xx physical address |

TABLE 4-continued

| Data Element | Type | Comments |
|---|---|---|
| Interface module name | Alphanumeric | Name of the custom connector module |
| Interface method | Alphanumeric | HTTP = IP/HTTP protocol<br>CORBA = CORBA protocol<br>MQ = MQ Series protocol |
| Archive Platform | Alphanumeric | A1 = IBM OnDemand on AIX<br>A2 = IBM OnDemand on Solaris<br>B1 = Sybase/AMASSS on Solaris |
| Archive Status | Character | Active<br>Inactive |

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

We claim:

1. A system for managing information retrievals from distributed archive facilities comprising:
   a messaging layer providing access to each of the distributed archives;
   a user interface layer providing communication links to a plurality of users; and
   an archive access manager coupled to the messaging layer and coupled to the user interface layer, the archive access manager comprising:
      an application interface manager coupled to the user interface layer, the application interface manager providing input and output services with respect to users of the system, the application interface manager determining the distributed archive where the requested information is stored,
      a core processing block coupled to the application interface manager, the core processing block managing requests for information retrievals and formatting retrieved information, and
      an archive information manager coupled to the core processing block and coupled to the messaging layer, the archive information manager transmitting the requests for information retrievals to the distributed archives and receiving the retrieved information from the distributed archives.

2. The system according to claim 1, wherein the application interface manager further comprises:
   an input processing section, the input processing section validating the requests for information retrievals from the users; and
   an output processing section, the output processing section formatting the retrieved information in a format compatible with communication media employed by the users.

3. The system according to claim 1, wherein the input processing section further determines if a request for an information retrieval requires retrievals from more than one of the distributed archives.

4. The system according to claim 1, wherein the core processing block further comprises:
   a queue manager, the queue manager queuing the requests for information retrievals;
   a retrieval fulfillment module retrieving requests from queues established by the queue manager and determining if the requested information has been cached by the archive access manager; and
   an output control module, the output control module reformatting the retrieved information if necessary, the encrypting the retrieved information if necessary, and authenticating the retrieved information if necessary.

5. The system according to claim 4, wherein the output control module further aggregates the retrieved information if retrievals from more than one of the distributed archives was required.

6. The system according to claim 1, further comprising an audit log, the audit log containing a log of the operations performed by the archive access manager to enable auditing of system performance and tracking of the requests for information retrievals.

7. The system according to claim 1, further comprising:
   an administrative manager coupled to the archive access manager, the administrative manager performing administrative functions with respect to the operation of the archive access manager.

8. The system according to claim 7, wherein the administrative manager further comprises a statistical analysis section, the statistical analysis section generating performance profile models based on historical performance of the requests for information retrievals, and providing users with predicted response time based on the performance profile models.

9. The system according to claim 7, wherein the administrative manager further comprises a priority administration section, the priority administration section dynamically re-assigning priorities of the requests for information.

10. The system according to claim 7, wherein the administrative manager further comprises a caching control module, the caching control module maintaining caches of retrieved information.

11. The system according to claim 10, wherein the caching control module further maintains a cache retention schedule that controls the duration of the caching of particular retrieved information, and wherein the caching control module deletes cached retrieved information whose retention period has expired.

12. The system according to claim 7, wherein the administrative manager further comprises a security management section, the security management section providing user sign-on security.

13. The system according to claim 12, wherein the security management section ensures that the user is authorized to retrieve the requested information.

14. The system according to claim 12, wherein the security management section does not require separate sign-on procedures for each of the distributed archives from which information is requested.

15. The system according to claim 1, wherein the information to be retrieved from the distributed archive facilities is stored in hierarchically organized storage devices including Direct Access Storage Devices, optical disks and magnetic tape devices.

16. The system according to claim 1, wherein the information to be retrieved from the distributed archive facilities includes indexed data, documents and files.

17. The system according to claim 16, wherein the files includes images.

18. The system according to claim 17, wherein the images are stored in at least one of the following formats: TIFF/JPEG; TIFF/G4; Federal Reserve bank Common Output Format; TIFF/ABIC; IOCA/ABIC; MOD:CA/G4; JPEG; GIF; encrypted binary files; and BLOB (binary large object).

19. The system according to claim 16, wherein the files includes audio files and video files.

20. The system according to claim 1, wherein the a user interface layer further comprises a client/server interface.

21. The system according to claim 1, wherein the a user interface layer further comprises an Internet browser.

22. The system according to claim 1, wherein the a user interface layer further comprises a custom Application Program Interface (API).

23. The system according to claim 1, wherein the a messaging layer further comprises a cross connect matrix.

24. The system according to claim 23, wherein the cross connect matrix further comprises an IBM MQSeries messaging system.

25. The system according to claim 1, further comprising:
a second messaging layer providing access to each of the distributed archives;
a second user interface layer providing communication links to a plurality of users; and
a second archive access manager coupled to the second messaging layer and coupled to the second user interface layer, the second archive access manager comprising the same elements as the archive access manager, wherein the second messaging layer, the second user interface layer and the second archive access manager operate simultaneously with the messaging layer, the user interface layer and the archive access manager to retrieve information from the distributed archives.

26. The system according to claim 25, wherein the second messaging layer, the second user interface layer and the second archive access manager act as a backup to the messaging layer, the user interface layer and the archive access manager.

27. A method for retrieving information from distributed archive facilities comprising the steps of:
receiving a request for information from a user;
determining at which of the distributed archive facilities the requested information is stored;
retrieving the requested information from the distributed archive facilities to thereby generate retrieved information;
formatting the retrieved information to thereby generate formatted information; and
presenting the formatted information to the user.

28. The method according to claim 27, further comprising the step of validating the request for information from the user.

29. The method according to claim 27, wherein the formatting step further comprises formatting the retrieved information in a format compatible with a communication media employed by the user.

30. The method according to claim 27, wherein the determining step further comprises determining if a request for information requires retrievals from more than one of the distributed archives.

31. The method according to claim 30, further comprising the step of aggregating the retrieved information if retrievals from more than one of the distributed archives was required.

32. The method according to claim 27, wherein a plurality of requests for information are received, the method further comprising the step of queuing the plurality of requests for information.

33. The method according to claim 27, further comprising the step of determining if the requested information has been cached.

34. The method according to claim 27, further comprising the step of encrypting the retrieved information.

35. The method according to claim 27, further comprising the step of authenticating the retrieved information.

36. The method according to claim 27, further comprising the step of logging the execution of the steps of the method to enable auditing of system performance and tracking of the requests for information retrievals.

37. The method according to claim 27, further comprising the step of generating performance profile models based on historical performance of the requests for information retrievals.

38. The method according to claim 37, further comprising the step of providing users with a predicted response time based on the performance profile models.

39. The method according to claim 27, further comprising the step of assigning a priority to the request for information.

40. The method according to claim 39, wherein a plurality of requests for information are received and assigned priorities, the method further comprising the step of dynamically re-assigning priorities of the requests for information.

41. The method according to claim 27, further comprising the step of caching the retrieved information.

42. The method according to claim 27, further comprising the steps of:
maintaining a cache retention schedule that controls the retention period for caching retrieved information; and
deleting cached retrieved information whose retention period has expired.

43. The method according to claim 27, further comprising the step of requiring the user to follow a single sign-on security procedure.

44. The method according to claim 27, further comprising the step of ensuring that the user is authorized to retrieve the requested information.

45. The method according to claim 27, further comprising the step of using the single sign-on security procedure for providing access by the user to the information stored at the distributed archives from which information is requested.

46. The method according to claim 27, wherein the information is retrieved from the distributed archive facilities from hierarchically organized storage devices including Direct Access Storage Devices, optical disks and magnetic tape devices.

47. The method according to claim 27, wherein the retrieved information indexed data, documents and files.

48. The method according to claim 47, wherein the files includes images.

49. The method according to claim 48, wherein the images are in at least one of the following formats: TIFF/JPEG; TIFF/G4; Federal Reserve bank Common Output Format; TIFF/ABIC; IOCA/ABIC; MOD:CA/G4; JPEG; GIF; encrypted binary files; and BLOB (binary large object).

50. The method according to claim 47, wherein the files includes audio files and video files.

51. The method according to claim 27, wherein the receiving step further comprises receiving the request for information through a client/server interface.

52. The method according to claim 27, wherein the receiving step further comprises receiving the request for information through the Internet.

53. The method according to claim 27, wherein the receiving step further comprises receiving the request for information through a custom Application Program Interface (API).

54. The method according to claim 27, wherein the retrieving step further comprises retrieving the requested information through a cross connect matrix.

55. The method according to claim 54, wherein the cross connect matrix further comprises an IBM MQSeries messaging system.

56. The method according to claim 27, further comprising providing two separate systems for executing the method steps.

57. The method according to claim 56, wherein each of the separate systems act as backups for the other system.

* * * * *